United States Patent [19]

Gonsalves

[11] Patent Number: 5,672,807
[45] Date of Patent: Sep. 30, 1997

[54] PENDULUM DETECTOR TESTING DEVICE

[75] Inventor: John M. Gonsalves, Modesto, Calif.

[73] Assignee: Regents of the University of California, Oakland, Calif.

[21] Appl. No.: 579,028

[22] Filed: Dec. 18, 1995

[51] Int. Cl.⁶ .................................................. G01N 33/00
[52] U.S. Cl. .................................................. 73/1 R; 340/515
[58] Field of Search .................... 73/1 R, 1 D; 324/202; 340/515

[56] References Cited

U.S. PATENT DOCUMENTS

| | | | |
|---|---|---|---|
| 3,776,030 | 12/1973 | Strimel | 73/855 X |
| 4,486,713 | 12/1984 | Gifford | 324/329 |
| 4,600,882 | 7/1986 | Cottrell, Jr. | 324/202 |
| 4,672,837 | 6/1987 | Cottrell, Jr. | 73/1 R |
| 4,725,818 | 2/1988 | Motyka et al. | 340/514 |
| 4,728,935 | 3/1988 | Pantus et al. | 340/515 X |
| 5,160,885 | 11/1992 | Hannam et al. | 73/1 R X |
| 5,404,111 | 4/1995 | Mori et al. | 324/758 |

*Primary Examiner*—Thomas P. Noland
*Attorney, Agent, or Firm*—L. E. Carnahan; Henry P. Sartorio

[57] ABSTRACT

A detector testing device which provides consistent, cost-effective, repeatable results. The testing device is primarily constructed of PVC plastic and other non-metallic materials. Sensitivity of a walk-through detector system can be checked by: 1) providing a standard test object simulating the mass, size and material content of a weapon or other contraband, 2) suspending the test object in successive positions, such as head, waist and ankle levels, simulating where the contraband might be concealed on a person walking through the detector system; and 3) swinging the suspended object through each of the positions, while operating the detector system and observing its response. The test object is retained in a holder in which the orientation of the test device or target can be readily changed, to properly complete the testing requirements.

20 Claims, 5 Drawing Sheets

PENDULUM DETECTOR TESTING DEVICE

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to walk-through detector systems, particularly to testing and/or calibration of such detector systems, and more particularly to a detector system testing device which can be utilized to test various locations in the walk-through detector system with consistent, repeatable results.

Walk-through detector systems have been conventionally used for screening passengers at airports. More recently, such detector systems have been utilized to screen visitors and prisoners in courthouses and prisons. Also, such systems are now being widely used to screen personnel and visitors at numerous public schools and high security risk areas. While these detector systems have been utilized as metal detectors for detecting guns, and other unauthorized metal objects, the function of such detectors have taken on additional meaning with the introduction of non-metallic material to produce weapons from plastics.

The sensitivity of a walk-through detector system must be periodically checked to assure detection of an undesired object passing through the archway of the detector. In the past, testing and/or calibration of a walk-through detector system has been carried out by test walkers carrying test objects on their person. The test objects were placed on various areas of the test walkers and turned in different directions. Approximately forty-five (45) successful passes through a walk-through detector are necessary to complete the test. For many applications, the test walkers were required to carry weapons, explosives, etc. which were dangerous to both the test walker and personnel operating the detector system. Also, such testing procedures were carried out by persons other than the detector system operators, thus increasing the manpower and associated costs.

Recently, efforts have been directed to the development of test systems for walk-through detector systems. Such walk-through detectors generally involve a booth or archway having sensors mounted in the archway, whereby head, waist and ankle levels of persons passing through the booth or archway can be checked for unauthorized objects or contraband. Such a test system for walk-through metal detectors is exemplified by U.S. Pat. No. 4,672,837 issued Jun. 16, 1987 to W. C. Colttell, Jr., wherein the sensitivity of the detectors was checked by suspending a rope or cored from the ceiling, positioning a test object at different locations on the suspended rope, and swinging the suspended object through the detector system at speeds which simulate the passage of a person through the detector system, while operating the detector system and observing its response. The test object was moved to various locations on the rope and swung through the detector system, as well as being turned in different directions as it passed through the detector system. Problems with the test system of the above-reference patent was how to enable suspension of the rope or cord from the top of the walk-through detector system, and how to maintain repeatability of the swing through the detector due to flexing of the suspended rope which retained the test object.

Thus, a need has existed for a testing device which provides consistent, cost-effective, repeatable results, without the use of an individual test walker, and which can be readily and quickly installed in any walk-through detector system, and which can be operated by the detector system operator, thereby eliminating additional test personnel. This need is satisfied by the present invention, wherein the components of the testing device are primarily constructed of inexpensive PVC plastic and other non-metallic material, can be quickly assembled and/or modified for detection testing of various locations in the walk-through facility. The testing device can be mounted adjacent the ceiling or the floor of the walk-through detector and is composed of several quickly assembled PVC pipe sections attached to a plastic holder constructed to retain a test object, such as a weapon, knife, explosive, or other contraband desired to be detected. The plastic holder containing the test object is swung through the walk-through facility at different locations in a pendulum motion during a designated number of passes needed to complete the test. Due to the rigidity of the PVC components, consistent, repeatable results are obtained, and due to the simplicity of construction and operation the testing can be carried out by the detector facility operator, with minimum shut-down time of the detector.

SUMMARY OF THE INVENTION

It is an object of the present invention to provide a test system for walk-through detector facilities.

A further object of the invention is to provide a walk-through detector facility testing device which provides consistent, cost-effective, repeatable results.

A further object of the invention is to provide a detector test device which utilizes inexpensive rigid components which enable a pendulum motion of the test object as it passes through the detector system.

Another object of the invention is provide a testing device for a detector system which utilizes inexpensive PVC plastic and other non-metallic components which can be quickly assembled and positioned in various areas of the detector system to enable consistent, repeatable results by passing a test object through the detector system in a pendulum motion.

Other objects and advantages of the present invention will become apparent from the following description and accompanying drawings. Basically, the invention is a detector testing device providing a mechanical method of testing any detector's capability in detecting a known source, such as metal (weapon or knife), passing through the archway of the detector. Traffic flow or process rate of individuals through the metal detector is increased by establishing a predetermined setting based on a known or given threat target. The enhancement has resulted in improved customer satisfaction by not impeding or slowing down traffic flow with higher than necessary sensitivity settings while not degrading the acceptance level of the detector. The detector testing device is primarily constructed of PVC, a rigid plastic which can be molded into various components. The testing device is composed of several pieces of PVC tubing or pipe attached to a plastic holder. The test object, such as a weapon encapsulated in a protective cover, is secured in the holder with plastic screws. The holder and enclosed weapon simply swings through the archway of a walk-through detector system, for example, in a pendulum motion during any designated number of passes needed to complete the test. The components of the test device can be easily assembled and positioned in various locations of the detector facility archway whereby consistent, repeatable results for locations such as head, waist and ankle locations of persons passing through the detector facility.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

The present invention involves a detector tester which utilizes a pendulum motion for passing a test object through a detector system. The detector testing device provides consistent, cost-effective, repeatable results, and can be quickly installed and operated by the detector system operator. The unique feature of the testing device is that the components are constructed of PVC plastic and other non-metallic material and are designed to enable quick installation/repositioning for testing and/or calibration of a detector system, such as the conventional walk-through detector systems.

While the invention is described hereinafter as a test system for a walk-through metal detector for the detection of metallic objects carried on a person passing through the detector, it has applications for testing and/or calibration of other types of detector systems wherein an object to be detected is moved past a stationary detector. Also, the type of detectors and the sensitivity thereof may vary depending on the materials or compositions to be detected. The test object would be designed or constructed to simulate the mass, size, and composition of the item or items desired to be detected by the detection system. By swinging the test object via a pendulum motion past a detector while operating the detector and observing its response, consistent and repeatable results are obtained.

Figure 1:
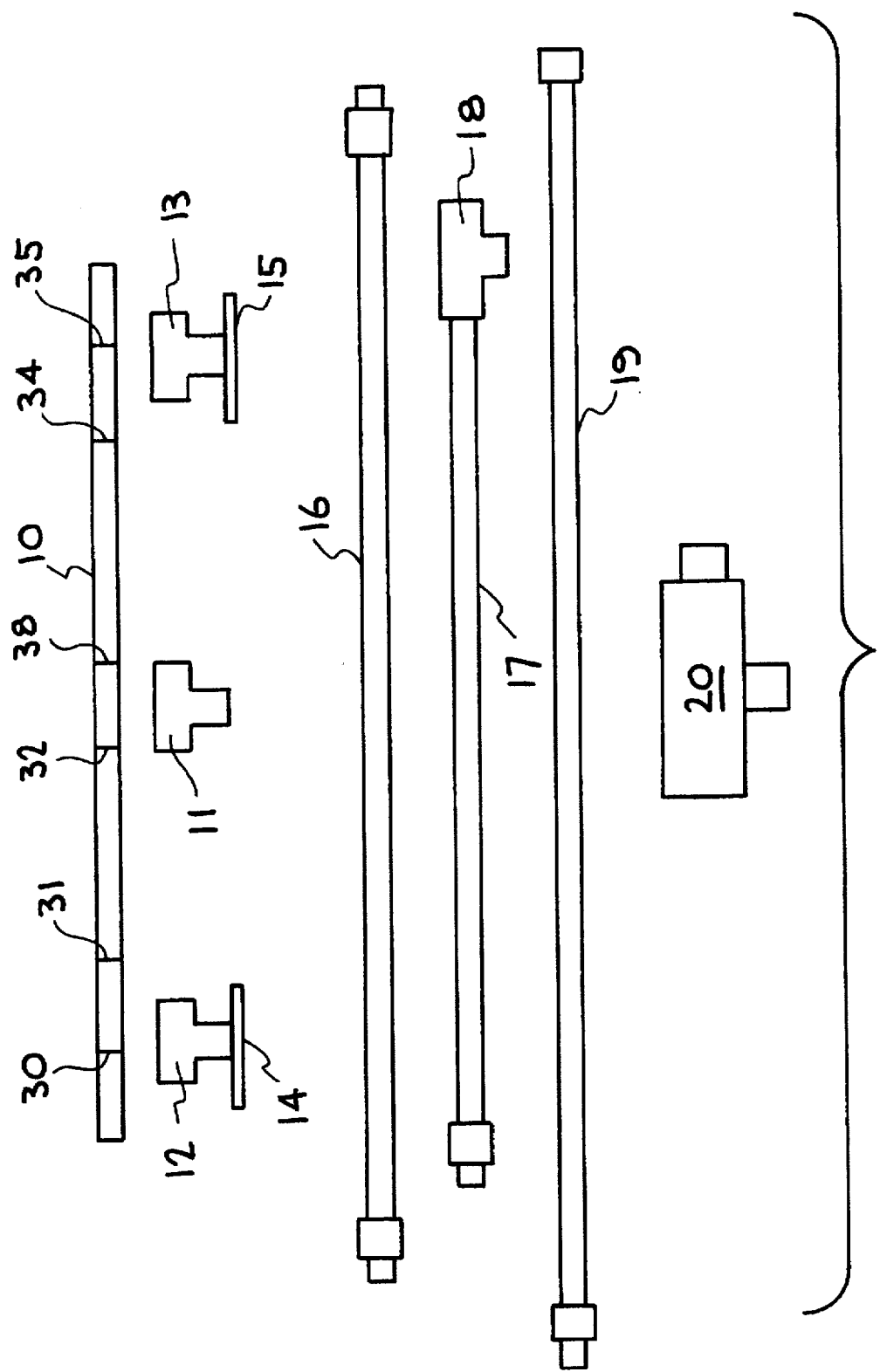
FIG. 1 illustrates the various components of an embodiment of the detector testing device made in accordance with the present invention.

Referring now to the drawings, FIG. 1 illustrates the components of an embodiment of the testing device for mounting in a walk-through detector facility to enable high, intermediate, and low test locations. Should additional test locations be needed, additional PVC test holder extensions of different lengths would enable testing of any desired location by utilizing a combination of extensions. Also, as seen with respect to FIGS. 2-4, the test holder can be moved to various side-to-side locations to enable a complete testing of detectors located anywhere in the detector archway.

Figure 2:
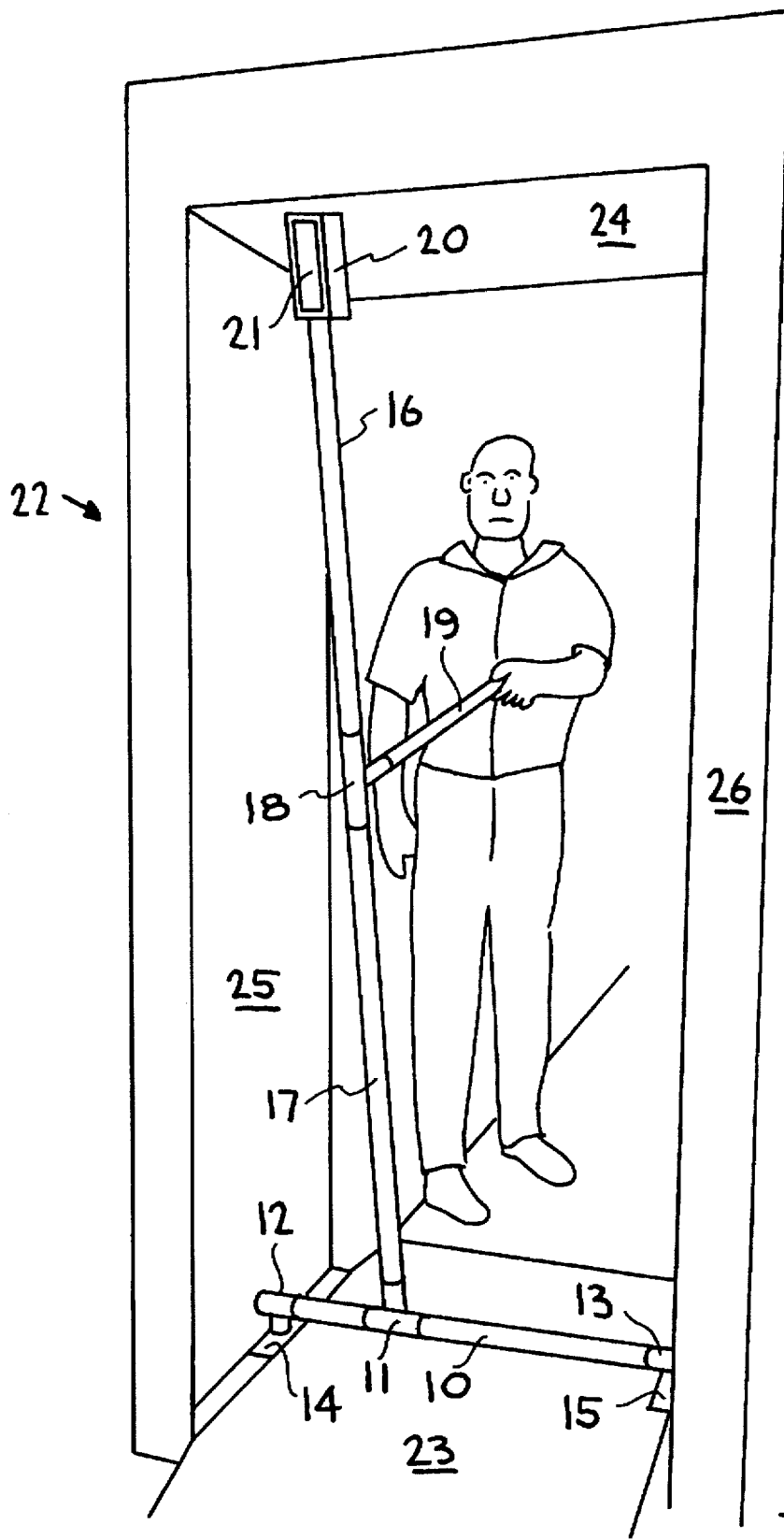
FIG. 2 illustrates the detector testing device positioned to test an upper area of a walk-through detector system.
Figure 3:
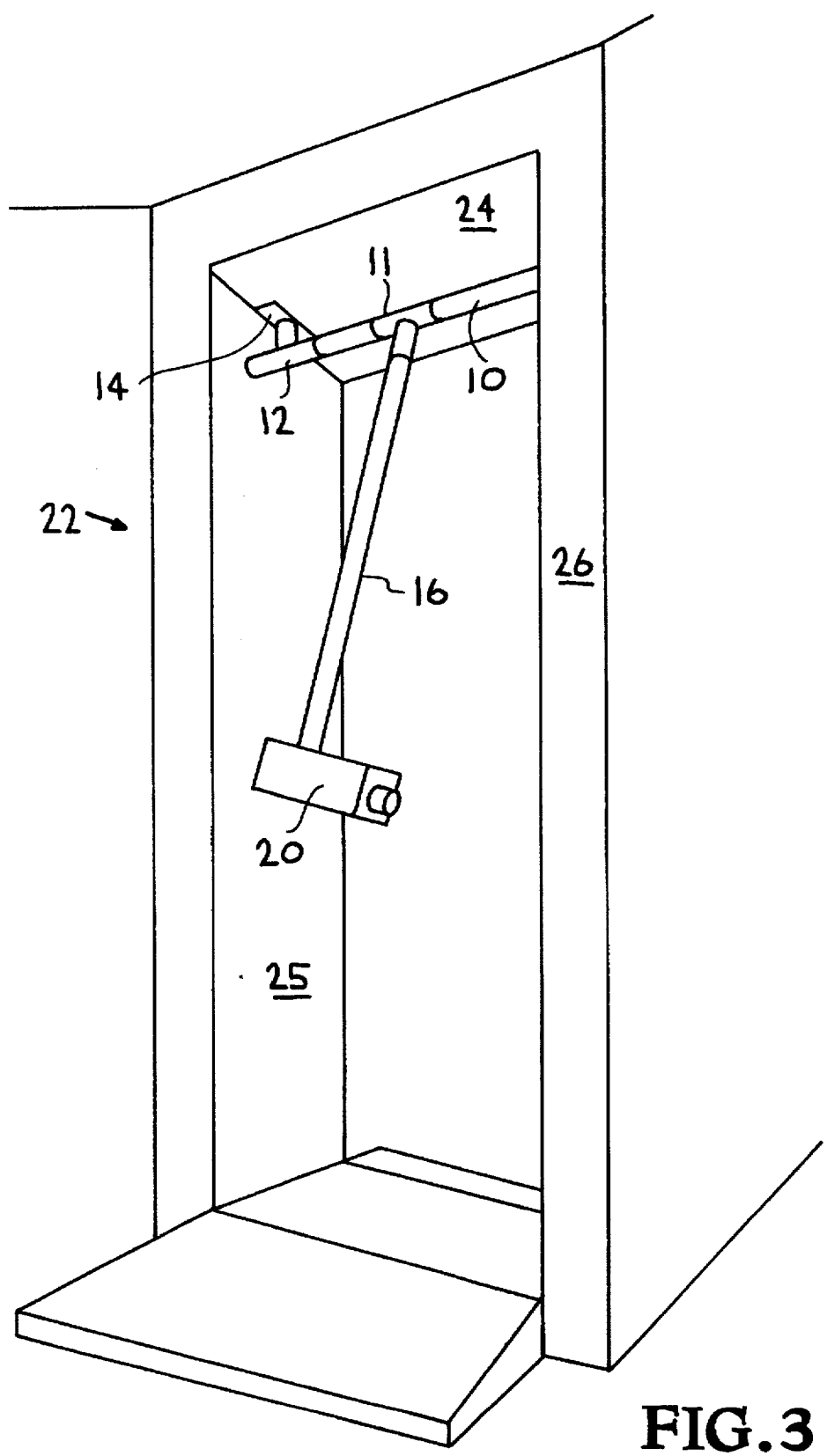
FIG. 3 illustrates the detector testing device positioned to test an intermediate area of a walk-through detector system.
Figure 4:
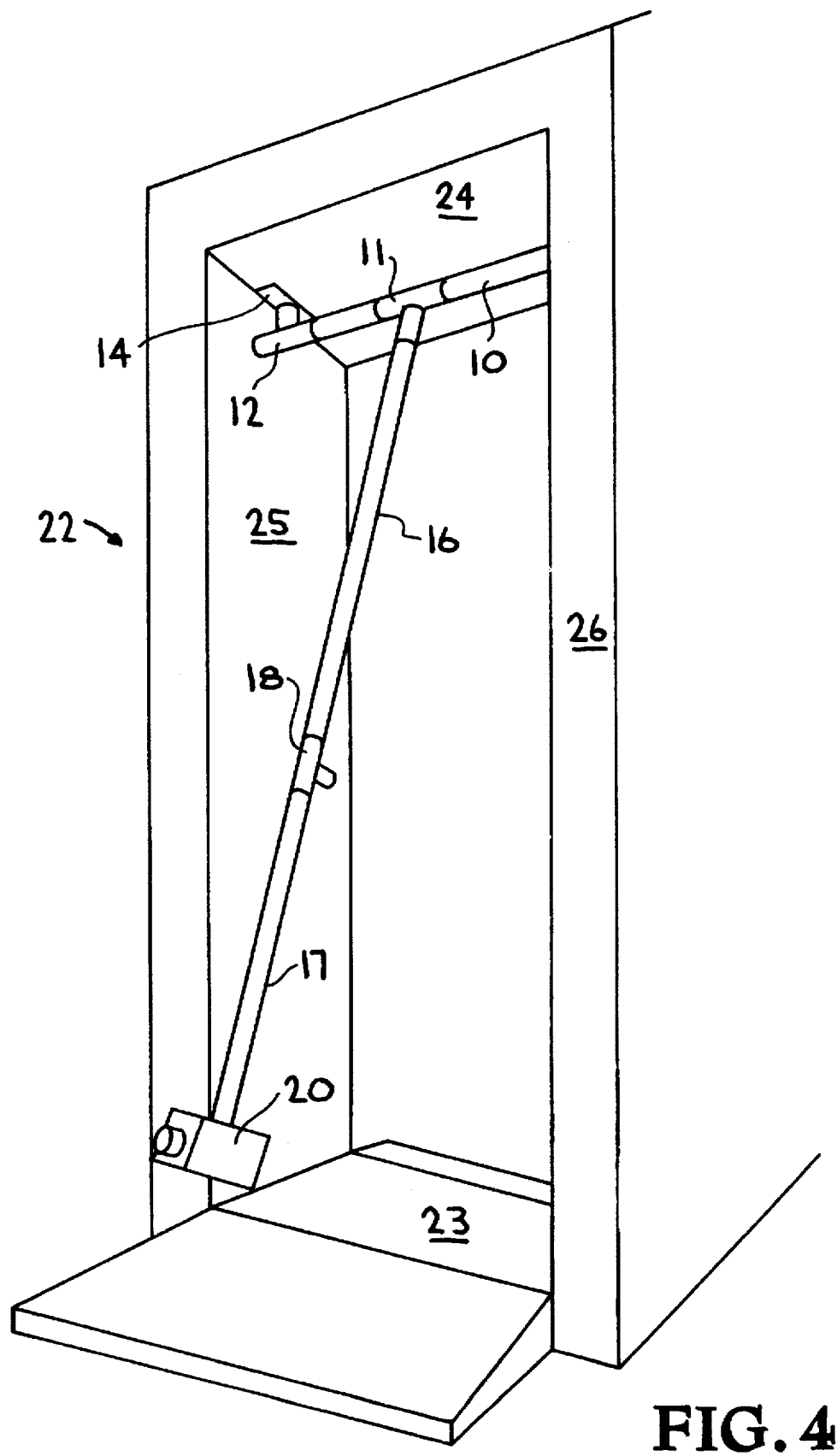
FIG. 4 illustrates the detector testing device positioned to test a lower area of a walk-through detector system.

As shown in FIG. 1, the tester components comprise a rod, dowel or pipe 10 composed of PVC or wood onto which is slidably positioned a PVC T-shaped swivel 11, with the rod 10 being retained by a pair of PVC brackets 12 and 13 which are slip fitted over the ends rod 10 and include Velcro attachments (a fastening tape used especially for cloth products) 14 and 15. A PVC extension 16 and/or a PVC extension 17 with a PVC coupler 18 are adapted to be connected to the PVC swivel 11. A PVC handle 19 is adapted to be connected to coupler 18, as shown in FIG. 2, and a plastic test object holder 20 is adapted to be connected to the coupler 18, as seen in FIGS. 2, 3 and 4. The holder 20 includes a removable test source or target 21 secured by plastic screws, as seen in FIG. 2, by which a test object such as a weapon can be retained in holder 20. The desired area of testing will determine where and which of the components of FIG. 1 will be located and/or utilized, as illustrated in FIGS. 2-4. By way of example, the test object or target retained in holder 20 may be a 25 caliber automatic, a 22 caliber revolver, or a 380 caliber Derringer, which are small weapons, or a knife, explosive, etc., depending on the role or use of the detector, and the sensitivity is adjusted accordingly.

FIG. 2 illustrates the tester device positioned to test the ceiling, upper or head area of a walk-through detector system generally indicated at 22 having a floor section 23, a ceiling section 24, and a pair of transmitter and receiver side sections 25 and 26. As shown in FIG. 2 a rod or dowel 10 is secured adjacent floor 23 via brackets 12-13 and Velcro attachments 14 and 15, with swivel 11 positioned on rod 10 and connected to extension 17 and coupler 18, with extension 16 interconnecting coupler 18 with test object holder 20, and handle 19 connected to coupler 18. Handle 19 may, for example, be four (4) feet in length. Movement of handle 19 by a test operator to about twelve (12) inches from the detectors and release thereof causes the components 17, 18, 16 and 20 to swing through the archway of the detector system 22 with a pendulum motion such that the holder 20 containing a test object, such as a weapon, moves pass an upper or head area of the detector's sides section 25 and 26 containing the transmitter and receiver, not shown. The movement of holder 20 should simulate the speed of a person walking past the detectors. Sensors in the sides of the detector system 22 activate an alarm or other known detection signal as the test object holder 20 passes thereby, simulating a weapon being carried in an upper portion of a person passing through the detector system 22. The components 11, 17, 18, 16 and 20 can be moved sidewise along the length of rod 10 whereby different sections of the upper area of the detector system 22 can be tested from side section 25 to side section 26. This is accomplished by moving the swivel 11 to be located between marks 30-31, 32-33 and 34-35 on support rod or dowel 10. For repeated testing, the rod 10 is provided with marks, 30-31, 32-33 and 34-35 along the length so that the swivel 11 and connected components can be moved to the same location for each repeated test.

FIG. 3 illustrates the testing device positioned so as to test sensors located in an intermediate or waist area of the archway of the detection system. Here, the components 10-15 are secured to ceiling section 24 of detector system 22 via the Velcro attachments 14 and 15 with extension 16 interconnecting swivel 11 and holder 20. Note that holder 20 is positioned 90° from the position shown in FIG. 2. Moving the holder to different locations enables different responses from the detectors in wall sections 25 and 26 of detector system 22, since the same test object is seen by the detectors from a different direction, thereby increasing or decreasing the size of the test object. The test sequence may include changing of the test holder configuration to different points on a 360° sweep as well as moving it from side to side along rod 10 between walls 25 and 26 at points 30-31, 32-33 and 34–35, for example. As in FIG. 2, testing is carried out by swinging the holder 20 and associated components in a pendulum motion through the archway of the detector system 22.

FIG. 4 illustrates testing of a lower floor, or ankle area of the archway of the detector system 22, and the tester components are positioned as in FIG. 3 except that the extension 17 and coupler 18 interconnect extension 16 and holder 20 to enable the holder 20 to swing in a pendulum motion across a lower area of the archway of the detector system 22 and near the floor section 23. As shown in FIG. 3, the orientation of holder 20 is changed compared to either of FIGS. 2 and 3, and as described above may be rotated to the same or other different positions and/or moved from side-to-side between wall sections 25 and 26 for testing detectors located in the lower area of the detector system 22.

If required or desired, detector can be mounted on the floor section 23 and ceiling section 24 of detector system archway 22, and tested using the tester device described above. Also, the components of FIG. 1 can be expanded to include one or more shorter extensions such that a combination of extensions will enable testing of any portion of the archway of the detector system from the floor section to the ceiling section.

Figure 5:
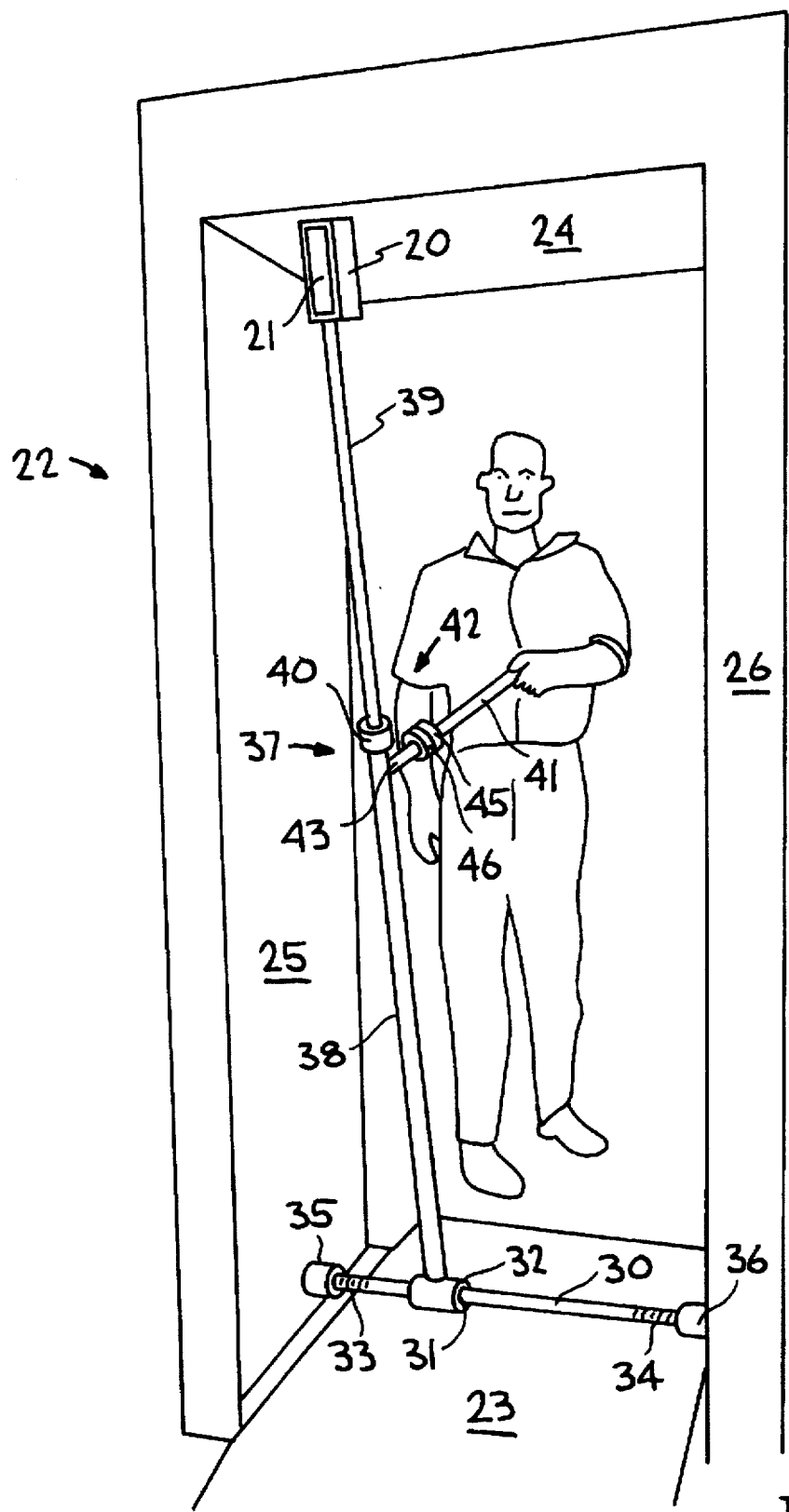
FIG. 5 illustrates another embodiment of the detector testing device using telescroping and adjustable components.

The FIG. 5 embodiment is similar to that illustrated in FIG. 2 and corresponding components will be given corresponding reference numbers. The differences between the FIG. 2 and FIG. 5 embodiments are in the components 10–15 and components 16–18 of FIG. 2. In FIG. 5, the components 10–15 of FIG. 2 are replaced with a solid rod 30 which extends through an opening 31 in a swivel 32, and provided at each end with threads 33 and 34 on which are threaded adjustment members 35 and 36, respectively, which can be turned so as to secure rod 10 to wall or side sections 25 and 26 of walk-through detector system 22, thereby eliminating the brackets 12–13 and Velcro attachments 14–15 of FIG. 2. One of the adjustment members 35 and 36 may be omitted. The swivel 32 is secured to a telescoping assembly 37 composed of a larger hollow member 38 and a smaller solid member or rod 39, which replace components 16–18 of FIG. 2. Member or rod 39 is provided on its outer end with a coupler, not shown, for connection to holder 20. Telescoping assembly 37 additional included a member 40 which when rotated releases or retains rod 39, thus allowing rod 39 to be movably fixed at different locations with respect to hollow member 38. A handle or rod 41 is connected via a coupler 42 to a rod or member 43 connected to hollow member 38. The coupler 42 may include Velcro pieces, not shown, for connecting ends 45 and 46, or may constitute another type of coupling/release mechanism. Thus, as handle 41 is pushed or pulled, the telescoping assembly 37 moves holder 20 through the system 22, as described above, to test the upper or head area of system 22.

The embodiment of FIG. 5 can be utilized similar to that of FIGS. 3 and 4 by adjusting the telescoping assembly 37 and moving the support rod 30 to a central or upper location within walk-through system 22.

It has thus been shown that the present invention provides a detector testing device which provides a standardized, repeatable method of testing, which produces consistent results. The testing device is constructed of inexpensive components, can be quickly installed, and can be utilized by the detector system operator, with a minimum of downtime of the system.

While a particular embodiment of the invention, along with specific materials, sizes, etc., have been described and/or illustrated to exemplify and describe the features of the invention, such are not intended to be limiting. Modifications and changes may become apparent to those skilled in the art, and it is intended that the invention be limited only by the scope of the appended claims.

The invention claimed is:

1. A detector testing device for an associated walk-through detection system, comprising:

a holder constructed to retain an associated test object;

a rigid support means adapted to be secured in such an associated walk-through detection system;

a member movably mounted on said support means; and at least one rigid member interconnecting said movably mounted member and said holder;

whereby movement in a pendulum motion through such an associated walk-through detection system of the holder retaining such an associated test object past an associated detector to be tested of such an associated walk-through detection system results in testing of the associated detector.

2. The testing device of claim 1, wherein said holder includes a removable section to enable such an associated test object to be positioned therein.

3. The testing device of claim 1, wherein said support means includes a longitudinally extending member, and means for retaining said member at a point of use in such an associated walk-through detection system.

4. The testing device of claim 3, wherein said means for retaining said member includes a pair of brackets and means for securing said brackets at the point of use.

5. The testing device of claim 4, wherein said means for securing said brackets comprises a Velcro attaching arrangement.

6. The testing device of claim 5, wherein each component except said securing means is constructed of plastic.

7. The testing device of claim 3, wherein said longitudinally extending member is constructed of material selected from the group consisting of plastic and wood.

8. The testing device of claim 1, wherein said rigid member includes a coupler mounted on one end of said rigid member.

9. The testing device of claim 8, additionally including a handle removably connected to said coupler.

10. The testing device of claim 8, additionally including at least one rigid member connected intermediate said coupler and said holder.

11. The testing device of claim 1, wherein said at least one rigid member is constructed of plastic tubing having attaching means at each end of the tubing.

12. The testing device of claim 1, in combination with a walk-through detector system, and wherein said testing device is removably mounted in said detector system.

13. The combination of claim 12, wherein said support means is operatively mounted to an upper section or a lower section of said detector system, such that said holder moves through said detector system in a pendulum motion.

14. The combination of claim 13, wherein said holder is interconnected to said support member by said at least one rigid member to allow said holder to pass through different areas of said detector system.

15. The testing device of claim 1, wherein said rigid support means includes at least one adjustable end, and wherein said movably mounted member is composed of a telescoping assembly.

16. A method for testing detectors in a walk-through detection system, comprising:
   providing a holder for retaining a test object adapted to activate at least one detector in the detection system;
   providing at least one rigid member removably connected to the holder;
   movably mounting the at least one rigid member on a removable rigid support means;
   removably positioning the removable support means within the detection system; and
   swinging the holder and the at least one rigid member in a pendulum motion through the detection system such that the holder passes at least one detector in the detection system for activating same.

17. The method of claim 16, additionally including moving the at least one rigid member and the holder to different orientations on the removable support means, and repeating the swinging operation of the holder.

18. The method of claim 16, additionally including positioning the removable support means in different locations in the detection system, to enable testing of detectors located in various areas of the detection system by the holder passing thereby.

19. The method of claim 18, additionally including periodically repeating the positioning and swinging of the holder to enable the obtaining of repeatable testing of detectors in the detection system.

20. The method of claim 16, wherein the holder, the at least one rigid member, and the removable support means are constructed of non-metallic material.

* * * * *